United States Patent
Onuma

(10) Patent No.: US 8,288,906 B2
(45) Date of Patent: Oct. 16, 2012

(54) MAGLEV MOTOR AND PUMP

(75) Inventor: Hiroyuki Onuma, Saitama (JP)

(73) Assignee: Iwaki Co., Ltd. (JP)

( * ) Notice: Subject to any disclaimer, the term of this patent is extended or adjusted under 35 U.S.C. 154(b) by 348 days.

(21) Appl. No.: 12/601,491

(22) PCT Filed: Jan. 29, 2008

(86) PCT No.: PCT/JP2008/000107
§ 371 (c)(1),
(2), (4) Date: Nov. 23, 2009

(87) PCT Pub. No.: WO2009/095949
PCT Pub. Date: Aug. 6, 2009

(65) Prior Publication Data
US 2010/0172775 A1   Jul. 8, 2010

(51) Int. Cl.
*H02K 7/09* (2006.01)
(52) U.S. Cl. .................. 310/90.5; 310/216.099; 310/86
(58) Field of Classification Search .................. 310/90.5, 310/86, 216.099, 68 B; 417/423.7
See application file for complete search history.

(56) References Cited

U.S. PATENT DOCUMENTS

| 4,072,370 | A * | 2/1978 | Wasson | 310/90.5 |
| 5,481,146 | A * | 1/1996 | Davey | 310/90.5 |
| 6,268,674 | B1 | 7/2001 | Takahashi | |
| 6,885,121 | B2 * | 4/2005 | Okada et al. | 310/90.5 |
| 6,933,644 | B2 * | 8/2005 | Kanebako | 310/90.5 |
| 6,977,453 | B2 | 12/2005 | Yoda et al. | |
| 7,683,514 | B2 * | 3/2010 | Onuma et al. | 310/90.5 |
| 7,977,838 | B2 * | 7/2011 | Onuma | 310/90.5 |
| 2004/0150278 | A1 * | 8/2004 | Okada et al. | 310/90.5 |
| 2004/0160132 | A1 * | 8/2004 | Carter et al. | 310/12 |
| 2009/0079284 | A1 * | 3/2009 | Onuma et al. | 310/90.5 |
| 2009/0121571 | A1 * | 5/2009 | Onuma | 310/90.5 |

FOREIGN PATENT DOCUMENTS

| EP | 1376832 A1 | 1/2004 |
| EP | 1942282 A1 | 7/2008 |
| JP | 07312837 A * | 11/1995 |
| JP | 11-325073 A | 11/1999 |
| JP | 2001323899 A * | 11/2001 |
| JP | 2002005167 A * | 1/2002 |
| JP | 2003-199288 A | 7/2003 |
| JP | 2005-121157 A | 5/2005 |
| JP | 2006-14528 A | 1/2006 |
| JP | 2007-120635 A | 5/2007 |
| JP | 2007-306785 A | 11/2007 |
| WO | WO-02/080338 A1 | 10/2002 |

OTHER PUBLICATIONS

"International Application Serial No. PCT/JP2008/000107, International Search Report mailed Apr. 15, 2008", 2 pgs.
"International Application Serial No. PCT/JP2008/000107, Written Opinion mailed Apr. 15, 2008", (w/ Engflish Translation), 5 pgs.
"Japanese Application Serial No. 2008-529401, Official Action mailed May 24, 2011", 2 pgs.

* cited by examiner

*Primary Examiner* — Quyen Leung
*Assistant Examiner* — Alex W Mok
(74) *Attorney, Agent, or Firm* — Schwegman Lundberg & Woessner, P.A.

(57) ABSTRACT

A maglev motor and a pump using the maglev motor can be provided with strong magnetic bearing force generated by a simple structure, rotation losses of a rotor reduced with the generation of an eddy current suppressed, and a configuration of magnetic bearing can downsize by using a thin rotor.

5 Claims, 4 Drawing Sheets

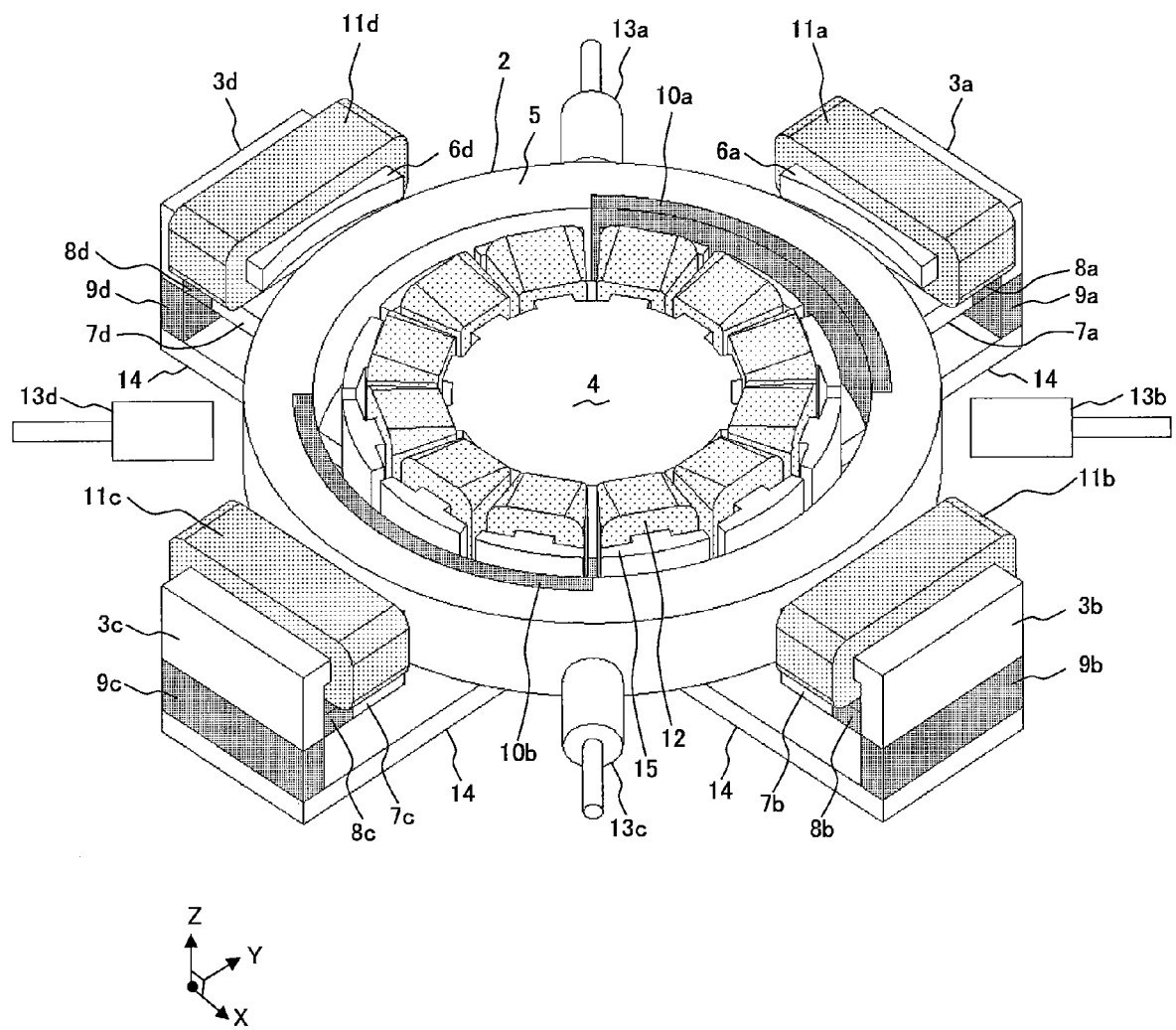
F I G. 1

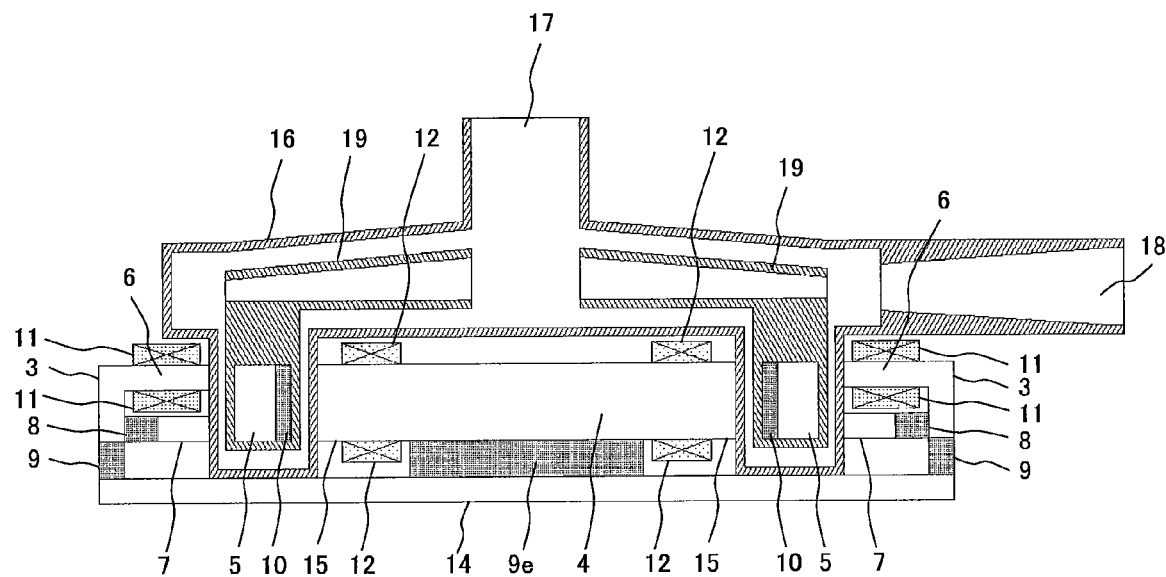
F I G. 4

MAGLEV MOTOR AND PUMP

RELATED APPLICATIONS

This application is a U.S. National Stage Filing under 35 U.S.C. 371 from International Application No. PCT/JP2008/000107, filed on Jan. 29, 2008, and published as WO 2009/095949 A1 on Aug. 6, 2009, which application and publication are incorporated herein by reference in their entirety.

TECHNICAL FIELD

The present invention relates to the structure and control of a maglev motor, and more specifically to the technology of a hybrid maglev motor in a double bias permanent magnetic system.

BACKGROUND ART

Recently, a hybrid maglev motor in a double bias permanent magnetic system has been proposed as a maglev motor.

A 5-axis-controlled hybrid magnetic bearing according to the patent document 1 realizes magnetic levitation and rotation on a long axis rotor for forming a pump impeller etc. by efficient 5-axis control using a permanent magnet for generating a bias magnetic flux. By devising a magnetic path of the bias magnetic flux, magnetic suspending force higher than that of a magnetic levitation system using only an electromagnet can be generated.

According to the patent document 2, a double bias magnetic bearing (magnetic suspension control) can generate further magnetic suspending force by providing a plurality of bias magnets for a conventional hybrid magnetic bearing. In addition, the flow of the magnetic flux of a secondary bias permanent magnet is induced by a primary bias permanent magnet, thereby realizing a more powerful hybrid magnetic bearing.

However, when the patent document 1 is applied to a pump etc., the projected poles for controlling the position in the axis direction on both end surfaces of a rotor complicate the structure of the inlet and the outlet of the pump, and causes difficult assembly. Furthermore, since the path of a liquid is complicated, intake and discharge losses increase. In addition, since the patent document 1 provides the magnetic bearings at the upper and lower portions of the rotor to suspend the rotor, it is difficult to generate a small hybrid maglev motor.

Additionally, since the patent document 2 has the structure of the projected poles arranged circularly on the magnetic bearing and having alternate polarity of N and S, an eddy current is generated when the rotor rotates, thereby increasing rotation losses of the rotor.

[Patent Document 1] Japanese Published Patent Application No. 2006-14528

[Patent Document 2] Japanese Published Patent Application No. 2007-120635

DISCLOSURE OF INVENTION

The present invention has been developed to solve the above-mentioned problems, and aims at providing a maglev motor and a pump using the maglev motor capable of reducing the rotation losses of a rotor by suppressing the generation of an eddy current, having a thinner rotor, and downsizing the structure of a magnetic bearing.

In a maglev motor having, as an aspect of the present invention, a stator configured by a magnetic bearing unit, a motor unit, and a bridge unit, and a rotor provided for the stator, a donut-shaped rotor is arranged between the magnetic bearing unit and the motor unit, the motor yoke of the motor radially has a plurality of projected poles, a coil is close-wound around the projected pole, predetermined clearance is made between the inner side of the rotor and the projected pole, a plurality of two projected poles opposite each other near either end portions of the outer side of the rotor are provided circularly at equal intervals on the magnetic bearing yoke of the magnetic bearing unit, a magnetic bearing coil is close-wound around one of the two projected poles, a first permanent magnet is provided for the other projected pole, predetermined clearance is made on one side of the rotor end portion and the bridge unit for connecting the magnetic bearing unit to the motor unit is provided, a second permanent magnet is provided between the projected pole provided for the magnetic bearing yoke and the bridge yoke of the bridge unit, a third permanent magnet is provided between the motor yoke and the bridge yoke, a plurality of motor permanent magnets opposite the motor yoke are provided inside the rotor, and all projected poles provided on the bridge unit side of the magnetic bearing unit can be close-wound by the magnetic bearing coil, or provided with the first permanent magnet.

With the above-mentioned configuration, strong magnetic bearing force can be generated by a simple structure, and the generation of an eddy current can be suppressed, thereby reducing the rotation loss of a rotor.

Preferably, the first permanent magnet of the projected pole provided opposite the rotor of the magnetic bearing unit can have the same magnetic pole as the rotor in all projected poles provided in the first permanent magnet, the magnetic pole of the magnetic bearing unit of the second permanent magnet can have an opposite magnetic pole to the magnetic pole of the rotor of the first permanent magnet, the magnetic pole of the motor unit side of the third permanent magnet can have an opposite magnetic pole to the magnetic pole on the magnetic bearing unit side of the second permanent magnet, and the magnetic pole on the motor unit side of the motor permanent magnet can be opposite the magnetic pole on the rotor side of the first permanent magnet.

Preferably, the magnetic bearing unit has a sensor for detecting the position of the rotor so that a control current can be provided for the magnetic bearing coil on the basis of the measurement value of the sensor.

It is also preferable that the rotor of the motor is a consequent rotor.

In addition, the maglev motor can be applied to a pump. According to the present invention, powerful magnetic bearing force can be generated by a simple structure, the rotation loss of a rotor can be reduced by suppressing the generation of an eddy current, and a thin rotor can passively magnetically suspend for the axial direction and the inclination, thereby simplifying the active control system of the magnetic bearing and designing a compact structure of the magnetic bearing.

BRIEF DESCRIPTION OF THE DRAWINGS

FIG. 1 is a perspective view of the structure according to the embodiment 1;

FIG. 4 is a sectional view of the pump using the maglev motor according to the present invention.

Figure 2:
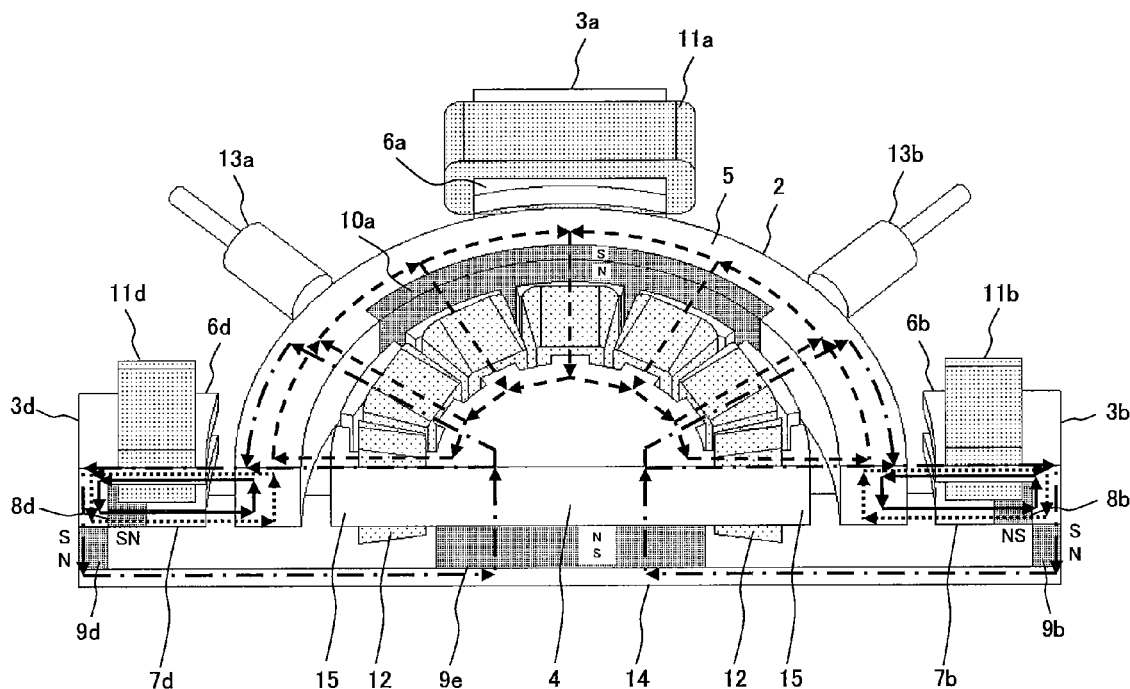
FIG. 2 is a perspective sectional view showing the direction of the magnetic flux line generated when the magnetic pole on the rotor 2 of the first permanent magnets 8 (8a through 8d) is opposite the magnetic pole on the rotor 2 of the first permanent magnets 8 (8e through 8h)
Figure 2:
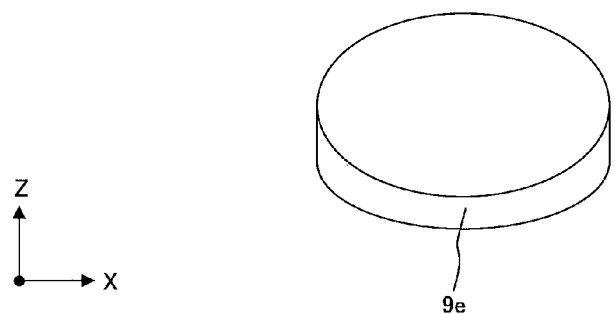

BEST MODE FOR CARRYING OUT THE INVENTION (Description of the Principle)

The present invention relates to a maglev motor.

A donut-shaped (for example, a hollow cylinder etc.) rotor is arranged between the magnetic bearing unit and the motor unit.

The motor yoke of the motor is provided with a plurality of projected poles radially. A coil is close-wound around the projected pole, and predetermined clearance is made between the inner side of the rotor and the projected pole.

The magnetic bearing yoke of the magnetic bearing unit is circularly provided with a plurality of two projected poles opposite each other near either end portions of the outer side of the rotor. One of the two projected poles has a magnetic bearing coil close-wound around the projected pole, and a first permanent magnet is provided for the other projected pole.

Predetermined clearance is made at one side of the rotor end portion for providing a bridge unit for connecting the magnetic bearing unit to the motor unit, a second permanent magnet is provided between the projected pole mounted for the magnetic bearing yoke and the bridge yoke of the bridge unit, and a third permanent magnet is provided between the motor yoke and the bridge yoke.

A plurality of motor permanent magnets are provided inside the rotor to face the motor yoke, and all projected poles mounted on the bridge unit side of the magnetic bearing unit have a magnetic bearing coil close-wound around the projected poles or have a first permanent magnet.

The embodiments of the present invention are described below in detail with reference to the attached drawings.

(Embodiment 1)

FIG. 1 shows an embodiment of the present invention. A stator 1 of the maglev motor is configured by a magnetic bearing unit provided outside a rotor 2 (donut-shaped) and a motor unit provided inside the rotor 2.

The magnetic bearing unit is configured by magnetic bearing yokes 3 (3a through 3d), a bridge yoke 14, magnetic bearing coils 11 (11a through 11d), first permanent magnets 8 (8a through 8d), and second permanent magnets 9 (9a through 9d).

First projected poles 6 (6a through 6d) of the magnetic bearing yokes 3 (3a through 3d) have magnetic bearing coils 11 (11a through 11d) close-wound around the respective projected poles.

Second projected poles 7 (7a through 7d) of the magnetic bearing yokes 3 (3a through 3d) are arranged opposite the first projected poles 6 (6a through 6d) substantially parallel to the axial direction, and has the first permanent magnets 8 (8a through 8d). An electromagnet is configured by each first projected pole 6 and each second projected pole 7. The second projected poles 7 (7a through 7d) having the first permanent magnets 8 (8a through 8d) are arranged with the same magnetic pole of each electromagnet facing the rotor 2.

Each electromagnet is circularly arranged at equal intervals in the direction of the diameter along the outer side of the rotor 2. The first projected poles 6 (6a through 6d) and the second projected poles 7 (7a through 7d) are provided facing the outer side of the rotor 2.

The second permanent magnets 9 (9a through 9d) are arranged between the second projected poles 7 (7a through 7d) of the magnetic bearing yokes 3 (3a through 3d) and the bridge yoke 14. The second permanent magnets 9 (9a through 9d) are arranged with the same magnetic pole as the magnetic pole of the rotor 2 facing the bridge yoke 14.

The bridge yoke 14 is provided for the bridge unit for connecting the magnetic bearing unit to the motor unit with predetermined clearance made at one side of the end portion of the rotor 2.

Furthermore, the bridge yokes 14 extend toward the direction of the motor unit from the second permanent magnets 9 (9a through 9d) of the magnetic bearing unit, and are disposed to provide a third permanent magnet 9e between the motor unit and the bridge yokes 14 in the vicinity of the point where the bridge yokes 14 cross one another.

The third permanent magnet 9e (cylindrical) of the motor unit is disposed with the same projected pole surface as the projected pole of the rotor 2 facing the motor yoke 4.

The motor unit is configured by the motor yoke 4 having a plurality of motor projected poles 15 facing the inner side of the rotor 2, and motor coils 12 wound around the motor projected poles 15.

The rotor 2 is configured as a thin consequent rotor in the direction of the axis. A consequent rotor has a portion disposed with the same magnetic pole of the motor permanent magnets 10a and 10b as the magnetic pole of the first permanent magnets 8 (8a through 8d) facing the rotor 2 facing the motor yoke 4 at the inner side of the rotor 2 facing the motor yoke 4, and a portion as a yoke (soft magnetic material) not the motor permanent magnets 10a and 10b.

When the dimension of the motor permanent magnet 10 is equal to the length (clearance) in the direction of the perimeter of the yoke portion at the inner side of the rotor 2, the consequent rotor 2 has the magnetic flux density of the clearance between the motor yoke 4 and the motor permanent magnet 10 a little higher than the magnetic flux density of the clearance between the motor yoke 4 and the yoke portion at the inner side of the rotor 2, and the negative spring force in the direction of the diameter between the rotor 2 and the motor unit becomes uneven. If the magnetic pole of the second permanent magnets 9 (9a through 9d) facing the motor yoke 4 is the same as the magnetic pole of the motor permanent magnets 10a and 10b of the consequent rotor 2 facing the motor yoke 4, then the magnetic path passing the yoke portion at the inner side of the rotor 2 has lower magnetic resistance than the magnetic path passing the motor permanent magnets 10a and 10b. Therefore, the bias magnetic flux from the first permanent magnet 8 forms the magnetic path passing the yoke portion at the inner side of the rotor 2 from the projected poles 15 of the motor yoke 4.

As a result, by appropriately designing the second permanent magnets 9 (9a through 9d) and the third permanent magnet 9e, the magnetic flux density at the clearance between the motor yoke 4 and the yoke portion at the inner side of the rotor 2 can be equal to the magnetic flux density at the clearance between the motor yoke 4 and the motor permanent magnet 10 by the magnetic flux of the motor permanent magnets 10a and 10b and the magnetic flux of the second permanent magnets 9 (9a through 9d) and the third permanent magnet 9e, thereby obtaining even negative spring force in the direction of the diameter. In addition, by increasing the magnetic flux density at the clearance between the motor yoke 4 and the yoke portion at the inner side of the rotor 2, the improvement of the motor torque can be expected. Furthermore, the thin rotor 2 can passively magnetically suspend the axial direction and the inclination of the rotor only by the magnetic attraction of the permanent magnet (passive stability), the magnetic suspension control of the magnetic bearing can be simplified, and the maglev of the rotor can be performed only by the position control by the electromagnet in the radial direction, thereby realizing a compact structure of the magnetic bearing. The magnetic attraction by the permanent magnet at the motor unit inside the rotor 2 and the magnetic attraction by the permanent magnet of the magnetic bearing unit outside the rotor 2 can realize excellent passive stability.

The materials of the above-mentioned first permanent magnet 8, second permanent magnets 9 (9a through 9d), third permanent magnet 9e, and motor permanent magnet 10 can be the hard magnetic materials such as neodymium-iron-boron, samarium-cobalt, samarium-iron-nitrogen, etc. The magnetic bearing yokes 3 of the stator 1, the motor yoke 4 and materials of a rotor yoke 5 of the rotor 2 can be soft magnetic materials such as magnetic soft iron, magnetic stainless steel, dust core, silicon steel sheet, etc. The materials are not limited to those listed above.

FIG. 2 is a perspective view of the section of the Z-X plane of the maglev motor shown in FIG. 1. The bias magnetic flux of the first permanent magnets 8 (8a through 8d) is indicated by dotted lines, the bias magnetic fluxes of the second permanent magnets 9 (9a through 9d) and the third permanent magnet 9e are indicated by alternate long and short dashed lines, the control magnetic flux of the magnetic bearing coil 11 is indicated by solid lines, and the motor bias magnetic flux of the motor permanent magnet 10a is indicated by broken lines as magnetic paths.

As shown in FIG. 2, the bias magnetic flux of the first permanent magnets 8 (8a through 8d) is the magnetic path passing "*—first permanent magnet 8—second projected pole 7—rotor yoke 5—first projected pole 6—*". The bias magnetic fluxes of the second permanent magnets 9 (9a through 9d) and the third permanent magnet 9e are the magnetic paths passing "*—third permanent magnet 9e of motor unit—motor yoke 4—rotor yoke 5 (also passing the yoke portion at the inner side of the rotor 2)—first projected pole 6—second permanent magnets 9 (9a through 9d) of magnetic bearing unit—bridge yoke 14—*". The control magnetic flux by the magnetic bearing coil 11 is the magnetic path passing "*—magnetic bearing coil 11—second projected pole 7—rotor yoke 5—first projected pole 6—*". The motor bias magnetic flux of the motor permanent magnets 10 (10a and 10b) is a magnetic path passing "*—motor permanent magnet 10—motor yoke 4—rotor yoke 5 (also passing the yoke portion at the inner side of the rotor 2)".

The bias magnetic fluxes of the first permanent magnets 8 (8a through 8d), the second permanent magnets 9 (9a through 9d), and the third permanent magnet 9e are overlapped in the same direction and supplied to the clearance between the first projected poles 6 (6a through 6d) and the rotor 2. The bias magnetic flux is supplied by the first permanent magnet 8 to the clearance between the second projected poles 7 (7a through 7d) and the rotor 2.

Since the magnetic flux from the motor permanent magnets 10a and 10b passes through the magnetic path from the motor yoke 4 to the yoke portion at the inner side of the rotor 2, the yoke portion at the inner side of the rotor 2 has a magnetic pole opposite the magnetic pole of the motor permanent magnets 10a and 10b facing the motor yoke 4.

Relating to the control magnetic flux by the magnetic bearing coil 11, when the control magnetic flux passes in the same direction as the respective bias magnetic fluxes in the clearance between the first projected poles 6 (6a through 6d) and the rotor 2 and the clearance between the second projected poles 7 (7a through 7d) and the rotor 2 by the direction (plus current or minus current) of the control current, the magnetic flux density of each clearance increases, and the magnetic attraction in the direction of the projected pole affecting the rotor 2 also increases.

On the other hand, in the clearance between the first projected pole 6 and the rotor 2 and the clearance between the second projected pole 7 and the rotor 2, the magnetic flux density in each clearance decreases and the magnetic attraction in the direction of the projected pole affecting the rotor 2 decreases when the control magnetic flux passes in the opposite direction of the bias magnetic flux.

The increase or decrease of the magnetic attraction can be realized by adjusting the control current on the basis of the measurement value of the position detection sensors 13 (13a through 13d) of the rotor 2, and the position control of the rotor 2 is performed. For example, when the rotor changes the position into the −X direction shown in FIG. 2, the electromagnet on the −X direction side passes the control current in the direction in which the magnetic flux density at the clearance between the first projected pole 6d and the rotor 2 and the magnetic flux density at the clearance between the second projected pole 7d and the rotor 2 can decrease. The electromagnet on the +X direction side passes the control current in the direction in which the magnetic flux density at the clearance between the first projected pole 6b and the rotor 2 and the magnetic flux density at the clearance between the second projected pole 7b and the rotor 2 can increase. Thus, the total sum of the magnetic attraction by each projected pole refers to the +X direction, and the rotor 2 can be moved in the +X direction.

On the basis of the measurement value of the position detection sensors 13 (13a through 13d) of the rotor 2, the direction and the level of the control current of each electromagnet are adjusted to control the position of the radial direction of the rotor 2.

(Example of the Configuration of Control of the Magnetic Bearing Unit)

Figure 3:
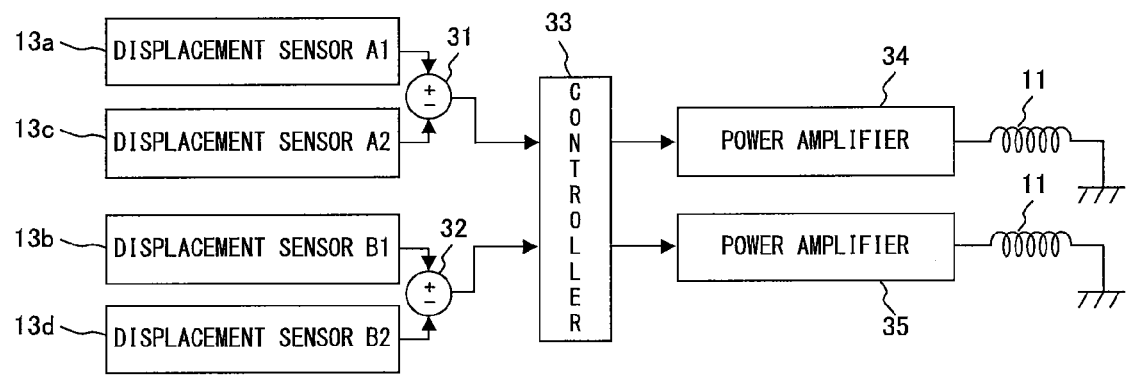
FIG. 3 is a block diagram showing the control unit of the magnetic bearing unit.

FIG. 3 shows an example of the configuration of the control of the magnetic bearing unit. The position of the rotor 2 in the direction of the diameter is detected by the position detection sensor 13 provided at a predetermined position in the direction of the diameter. Four position detection sensors 13 (13a through 13d) are arranged at equal intervals between the electromagnets of the respective magnetic bearing units. By setting the difference between two sensor outputs opposite each other in the position detection sensor 13 as the detection value, the improvement in detection sensitivity, the improvement in linearity, and the expansion in detection range can be expected.

It is preferable to detect differential by the two opposite sensors, but only one sensor on one side can perform detection and control.

On the basis of the output of the position detection sensor 13, a controller 33 can convert from the coordinates by the arrangement of the position detection sensor 13 to the coordinates by the arrangement of the electromagnet of the magnetic bearing, and calculates the current value to be applied to the electromagnet using the PID control rule etc. A command of the current value to be applied to the electromagnet from the controller 33 is supplied to power amplifiers 34 and 35, the power amplifiers 34 and 35 apply the current to the electromagnet, thereby controlling the position of the rotor 2

(Example of Application)

FIG. 4 shows an example of an application in which an centrifugal pump is configured by a maglev motor. The application example covers the rotor 2 with resin non-magnetic metal etc. to form an inlet 17 and an outlet 18 of resin, non-magnetic metal, etc. on the top surface of the rotor 2. It is also configured by a rotor impeller 19, a pump casing 16 of resin, non-magnetic metal, etc. for enclosure with predetermined clearance, and a stator (magnetic bearing unit and motor unit) to cover the pump casing 16.

The present invention is not limited to the above-mentioned embodiment, and can be realized as various types of improvement and change within the gist of the present invention.

DESCRIPTION OF REFERENCE NUMERALS

1 stator
2 rotor
3 magnetic bearing yoke
4 motor yoke
5 rotor yoke
6 first projected pole
7 second projected pole
8 first permanent magnet
9 second permanent magnet
9e third permanent magnet
10 motor permanent magnet
11 magnetic bearing coil
12 motor coil
13 position detection sensor
14 bridge yoke
15 motor projected poles
16 pump casing
17 inlet
18 outlet
19 impeller
31, 32 operating units
33 controller
34, 35 power amplifiers

The invention claimed is:

1. A maglev motor having a stator configured by a magnetic bearing unit, a motor unit, and a bridge unit, and a rotor provided for the stator, the maglev motor comprising:
    a donut-shaped rotor being arranged between the magnetic bearing unit and the motor unit;
    a motor yoke of the motor radially having a plurality of projected poles, a coil being close-wound around the projected pole, and predetermined clearance being made between the inner side of the rotor and the projected pole;
    the magnetic bearing unit including a plurality of magnetic bearing yokes, each of the magnetic bearing yokes including two projected poles opposite each other near either end portions of the outside of the rotor being provided circularly at equal intervals of the magnetic bearing unit;
    a magnetic bearing coil being close-wound around a first one of the two projected poles, and a first permanent magnet being provided for a second projected pole of the two projected poles;
    predetermined clearance being made on one side of the rotor end portion and the bridge unit for connecting the magnetic bearing unit to the motor unit being provided, a second permanent magnet being provided between the second projected pole provided for each of the magnetic bearing yokes and a bridge yoke of the bridge unit, and a third permanent magnet being provided between the motor yoke and the bridge yoke; and
    a plurality of motor permanent magnets opposite the motor yoke being provided inside the rotor, and all projected poles provided on the bridge unit side of the magnetic bearing unit being either close-wound by the magnetic bearing coil or provided with the first permanent magnet.

2. The maglev motor according to claim 1, wherein:
    the first permanent magnet of the second projected pole provided opposite the rotor of the magnetic bearing unit has the same magnetic pole as the rotor in all projected poles provided in the first permanent magnet; the magnetic pole of the magnetic bearing unit of the second permanent magnet has an opposite magnetic pole to the magnetic pole of the rotor of the first permanent magnet;
    the magnetic pole of the motor unit side of the third permanent magnet has an opposite magnetic pole to the magnetic pole on the magnetic bearing unit side of the second permanent magnet; and
    the magnetic pole on the motor unit side of the motor permanent magnet is opposite the magnetic pole on the rotor side of the first permanent magnet.

3. The maglev motor according to claim 1 or 2, wherein the magnetic bearing unit has a sensor for detecting the position of the rotor so that a control current can be provided for the magnetic bearing coil on a basis of a measurement value of the sensor.

4. The maglev motor according to claim 1 or 2, wherein the rotor of the motor is a consequent rotor.

5. The maglev motor according to claim 1, wherein the maglev motor is applied to a pump.

* * * * *